United States Patent Office 3,351,298
Patented Nov. 7, 1967

3,351,298
FILM END SECURING DEVICE PARTICULARLY FOR MINIATURE FILM
Rudolf Taesler, Stuttgart, Dietrich Becker, Stuttgart, Mohringen, and Gerhard Börner, Musberg, near Boblingen, Germany, assignors to Zeiss Ikon Aktiengesellschaft, Stuttgart, Germany, a corporation of Germany
Filed Feb. 8, 1966, Ser. No. 525,980
Claims priority, application Germany, Feb. 23, 1965, Z 11,355
9 Claims. (Cl. 242—74.1)

ABSTRACT OF THE DISCLOSURE

The present invention relates to improvements in a clamping device for selectively and optionally clamping the film to the internal periphery or surface of the reel core whereby in the event that the reel is employed on conventional projectors the film end will be displaced from the reel in the conventional manner and when the film reel is employed in connection with a projector having automatic means for disconnecting the projector such as film actuated switch means which is controlled by film tension during the complete unwinding of the film from the reel. Thus, the reel can be optionally used in connection with projectors having either the automatic control or with projectors of conventional type without such control.

---

This invention relates to a device for securing the end of a film strip to the core of a film reel and is particularly intended for use with substandard size or miniature motion picture film.

Securing devices of the kind referred to serve for securing the end of a film strip which has been threaded into a retaining slot provided in the core of a film reel, either manually or automatically. It is known that some means of holding the film is needed until the angle of embrace of the film around the reel core is sufficient to assure self-locking.

When unwinding a film strip wound-up in that manner, the film end will let go by itself as soon as the unwinding operation approaches the end. In order to facilitate the winding and rewinding operations, there have been introduced recently film projectors which stop automatically when the end of the film has been reached without releasing it from the reel. Tensioning of the film strip, whose end is securely attached to the reel core, gives here the signal for a switching-off impulse that causes stopping of the reel.

Projectors equipped with self-stopping devices require special film reels which cannot be used in projections of conventional construction. This fact creates problems on account of the higher cost of special reel manufacture and due to the limited possibility of application of such reels. Aside from this, in order to use these special reels each new film must first be transferred from a standard reel to a special reel, i.e., it must be unwound and rewound before it can be projected.

The likely introduction of a simplified projection method, utilizing film magazines into which a standard reel can be inserted, will most likely also take advantage of self-controlled stopping of the projector, so that the film may be rewound at once into the film magazine and is not completely unwound from the reel but remains anchored to the reel core.

It is an object of this invention to provide a device which secures the end of the film to the core of the reel as desired, so that the reel can be used either for a free runoff of the end of the film, or may also be used for anchoring the end of the film so that it will be tensioned to initiate an impulse for stopping the projector.

In accordance with this invention, the device provided has the feature that it can be manipulated while a complete film length is on the reel, and that in such a manner that at any time the end of the film can either be anchored to the core or can be released for unrestricted runoff at the end of the unwinding operation, just as desired.

In modification of the invention, the device can be so organized that some elements of it are assigned to the film reel and others to the film reel receiving fixture. When so organized, either a clamping operation or a releasing operation, depending on the type of receiving fixture employed, can be achieved automatically at the time the reel is mounted on the projector.

The invention will now be described in greater detail with reference to some embodiments illustrated in the accompanying drawings. Certain parts forming no part of the invention and which are not necessary for a clear understanding of the invention have been omitted.

Figure 1:
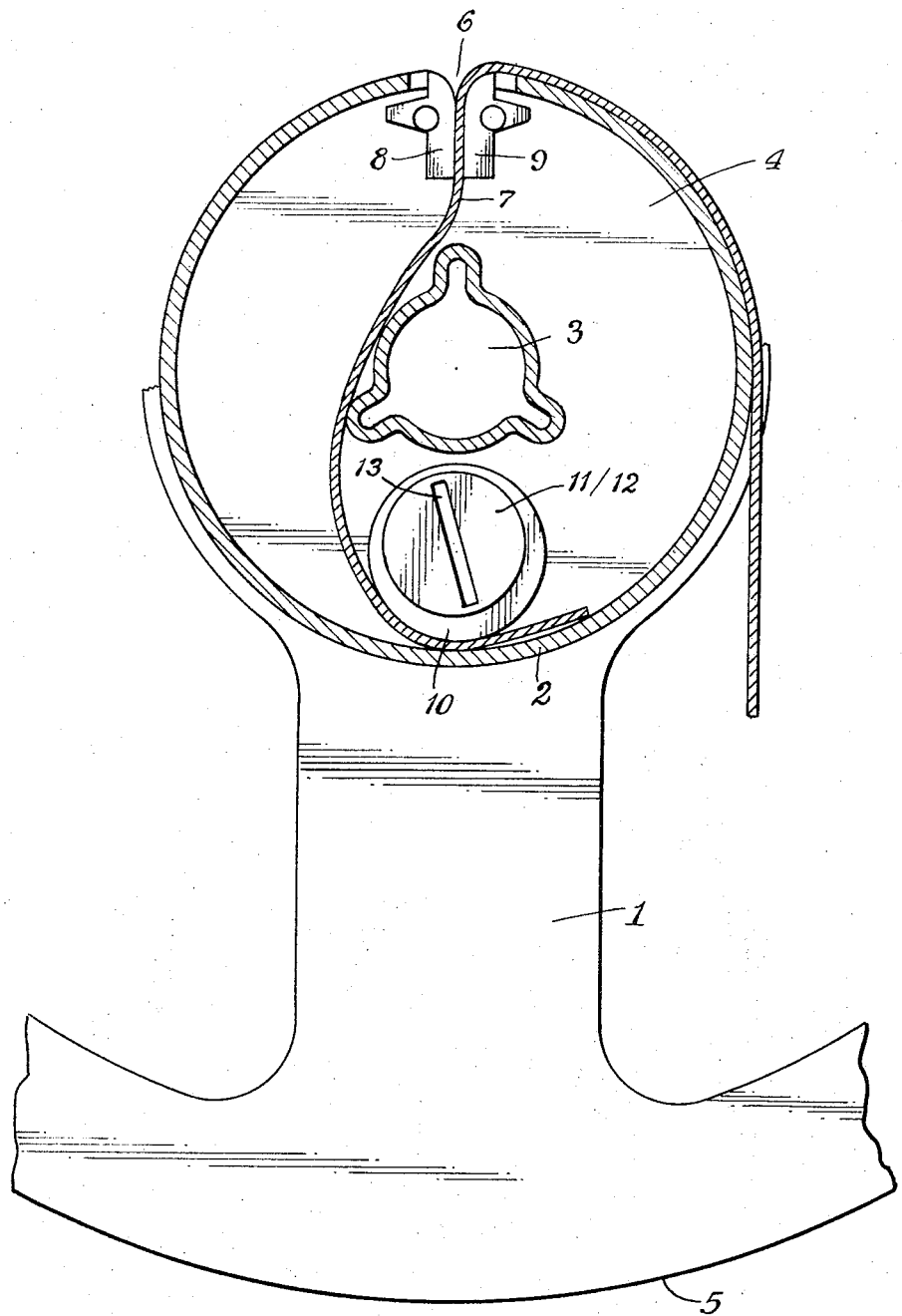
FIG. 1 is a fragmentary end view of a film reel provided with a manually operated film end securing device of the present invention.

Referring to FIG. 1, a partially illustrated film reel 1 has a reel core 2 in the form of a hollow cylinder. The core 2 has axially spaced end flanges 4 provided with mounting apertures 3 at their centers and extending beyond the circumference of the core 2 to the outer edge 5 of the film reel 1. The cylindrical wall of the core 2 is provided with a slot 6 for the insertion of the end of the film strip 7. Adjacent to the slot 6 inside the cylindrical wall is arranged the customary clamp 8, 9 which holds the film during the winding operation but releases it during the unwinding operation. Within the reel core 2, preferably diametrically opposed to the slot 6 is arranged a cylindrically clamping member 10 having axially alined, but eccentrically located circular pivot members 11 and 12 each journaled in one of the flanges 4. One of the pivot members 11 and 12 is provided with a diametrically disposed slot 13 suitable for inserting a coin from the outside of the reel 1.

When winding a film strip on the reel, the film end is first inserted into slot 6 and into the inside of hollow core 2 and is pushed sufficiently far so that its end extends into the space between the circumference of clamping member 10 and the inner face of the cylindrical core wall. If film is to be projected with a projector in which a free runoff of the film end is desired, then the clamping member 10 is left in its inoperative position. If, however, a projector is used that has the facility of being stopped by a switching impulse resulting from a tensioned film, then the reel must be prepared to achieve that result. This is easily accomplished by inserting a coin in the slot 13 of the pivot member and turning the clamping member 10 which, owing to its eccentricity, will clamp the film end 7 securely between its circumferential surface and the inner face of the hollow core 2. It is, of course, possible to repeat the clamping and releasing actions as often as desired, and it depends solely on the type of projector used on which the film reel 1 is attached.

Figure 2:
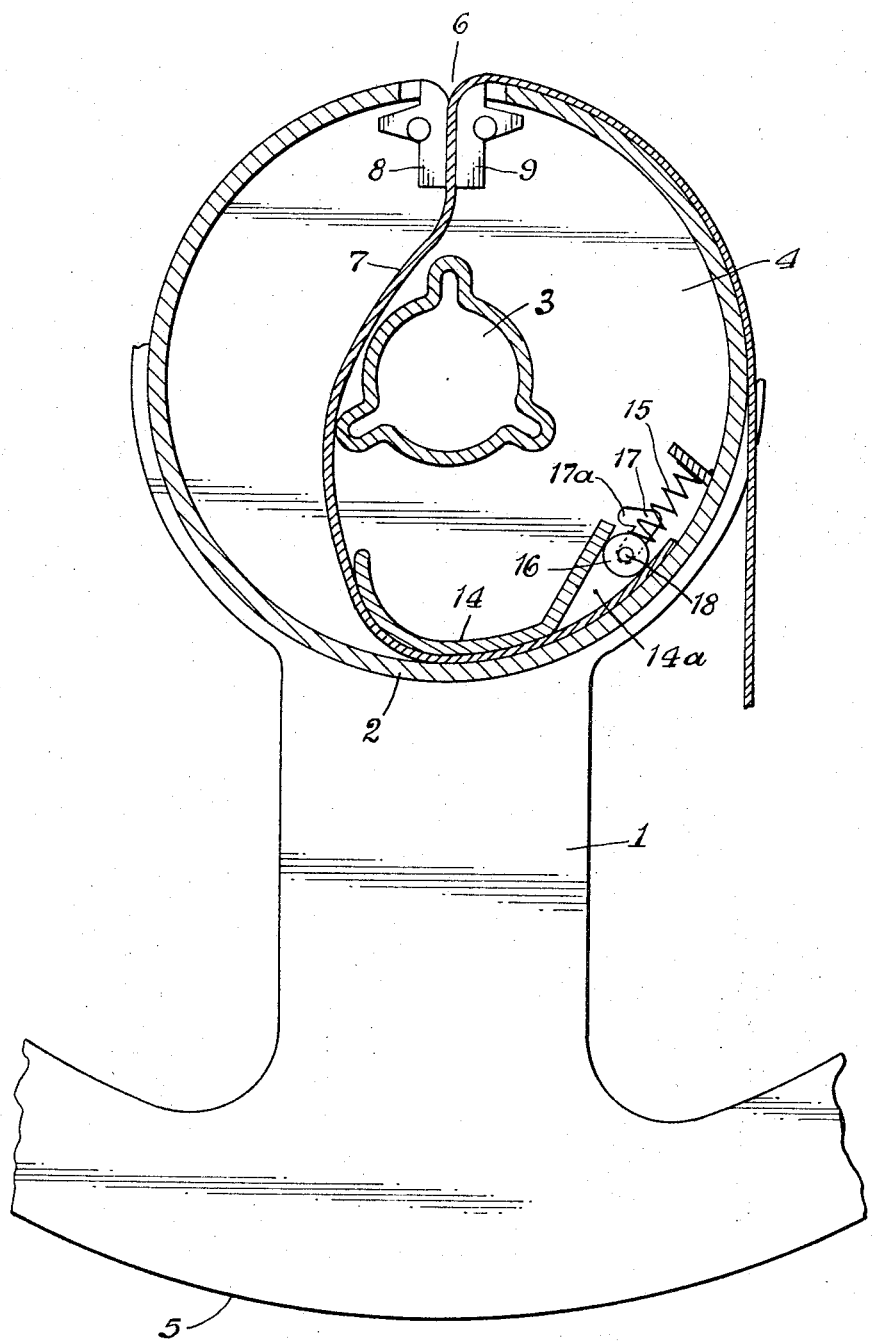
FIG. 2 is a similar view of a film reel having a modified film end locking device also used for manual operation.

In the modified film end securing device illustrated in FIG. 2, the eccentric clamping member 10 is omitted and in place thereof is used a curved shoe-like guide member 14 fixedly mounted on the inside of core 2 between the flanges 4. This curved shoe-like guide member 14 forms an arc-shaped slot ending in a wedge-shaped space 14a between itself and the inner face of the hollow core 2. In this wedge-shaped space a clamping roller 16 is movably disposed and is urged by a helical spring 15 toward the pointed end of this wedge-shaped space 14a. The roller 16 extends with axially alined pivot portions 18, one on each end, into slots 17 formed in the flanges 4. These slots 17 have lateral disposed notch-like portions 17a at their outer ends for a reason becoming clear later. The pivot portions 18 project through the flanges 4 a sufficient distance to the outside of the reel, so that they can be manually manipulated.

In this modification of FIG. 2, the film end can always be pushed in far enough into the hollow core 2 regardless whether the roller 16 is in a clamping position or not. When the roller 16 is in clamping position, it will be pushed back by the film against the weak tension of the spring 15 during the insertion of the film. In fact, the film end will slide between clamping roller 16 and the inner face of the hollow reel core 2. Upon pulling the film outwardly, the clamping roller 16, owing to the frictional action of the film, will be wedged tightly into the wedge-shaped space 14a between shoe-like member 14 and the inner face of the hollow core 2, thereby locking the film end securely. The film can be released by taking hold of the projecting pivot portions 18, pulling the roller 16 backwardly or outwardly of the wedge-shaped space 14a and moving the pivots into the lateral notch-like portions 17a of the slots 17. This causes the clamping roller 16 to release the film.

Figure 3:
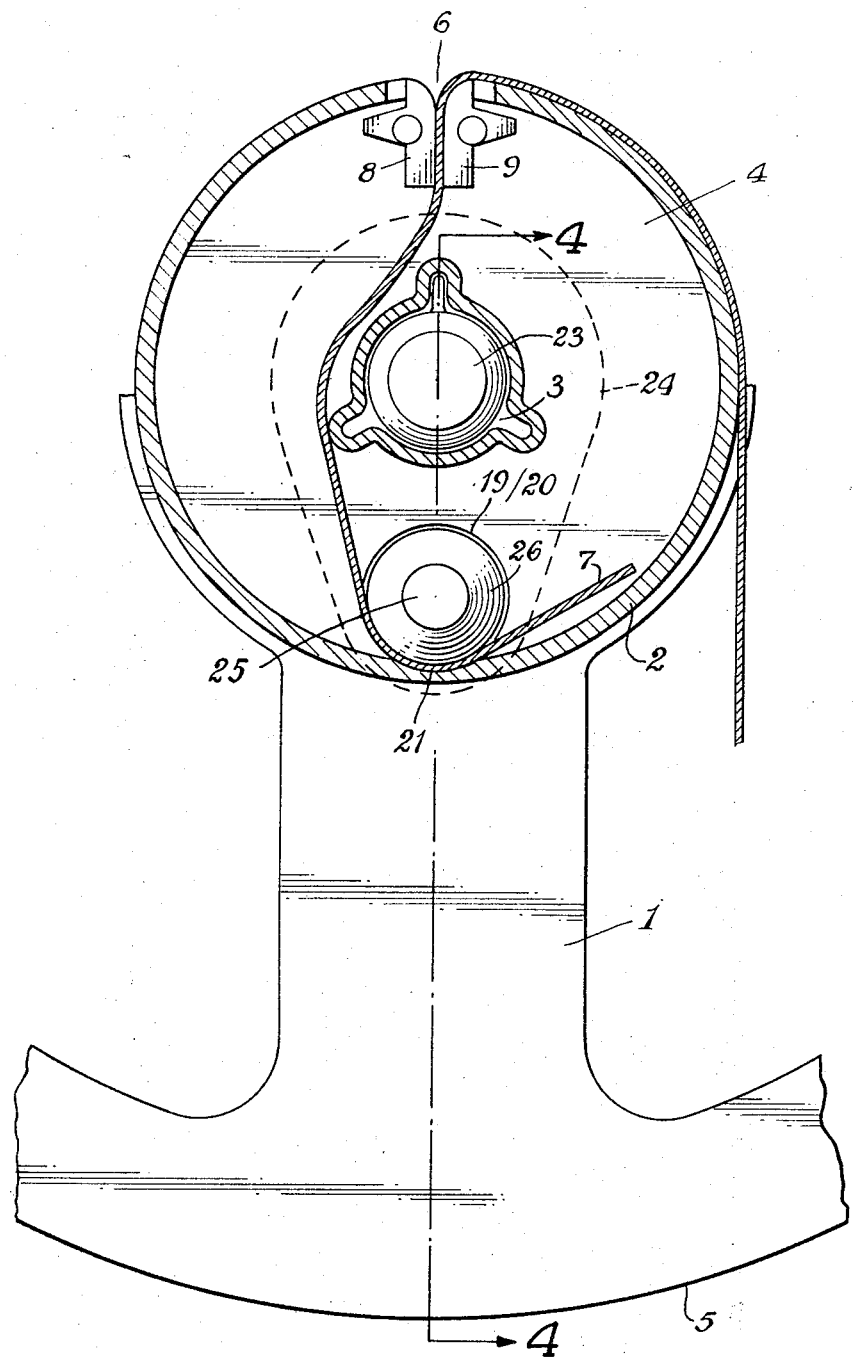
FIG. 3 is a similar view of a modified construction of the invention in which the film reel and the film reel receiving fixture are constructed to form together an automatic device for securing the film end.
Figure 4:
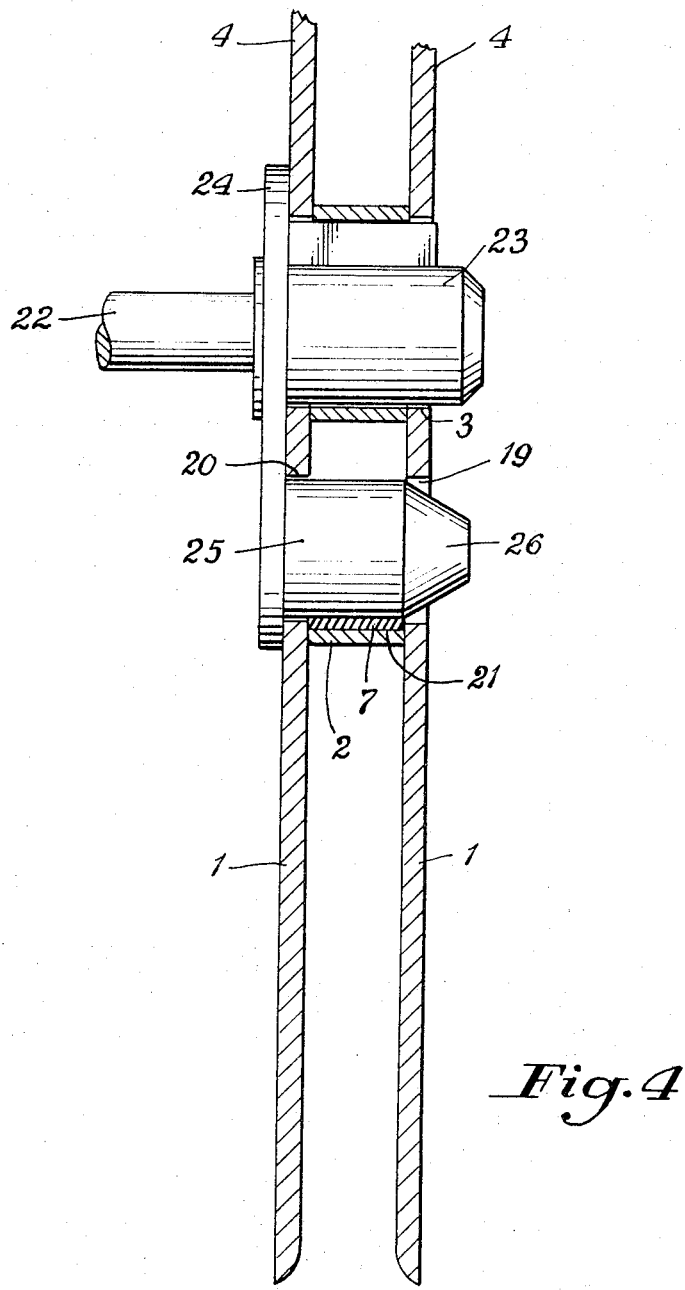
FIG. 4 is a fragmentary section taken approximately along the center line 4—4 of FIG. 3.

The FIGS. 3 and 4 illustrate another embodiment of the invention in which the device for securing the film end operates automatically and preferably at the instant when the film reel is put on the film reel receiving member of the projector. In place of the eccentric clamping member 10, the flanges 4 are only provided with axially alined circular apertures 19 and 20 adjacent the cylindrical wall of the core. These apertures are so arranged that a portion of their periphery is in alignment with a trough-like recess or cavity 21 provided in the cylindrical inner face of the hollow cylinder forming the reel core 2. These provisions on the film reel itself are supplemented by counterparts on the film reel receiving fixture. These include a receiving arbor 22 for engaging with its profiled end portion 23 the centrally disposed mounting aperture 3 provided in the film reel 1. In its mounted position, the film reel 1 abuts against a flange 24 on the arbor 22 which carries a circular clamping stud or bolt 25 having a conically tapered free end portion 26. The clamping stud or bolt 25 will extend with its cylindrical body portion through the axially alined apertures 19 and 20 and engages the entire width of the film when the film reel is completely pushed onto the arbor 22 and the stud or bolt 25.

From the foregoing description it will be clear that the film reel 1 alone is not equipped with a complete securing device for the film end 7. When this film reel is used on a projector requiring that the film end runs off and clears the reel entirely, the reel mounting fixture of such projector will not be provided with a clamping stud or bolt 25, and a fastening of the film end cannot occur neither intentionally nor accidentally. On the other hand, however, if such a reel is being employed on a projector having provisions for a stopping action which become effective upon a tensioning of the film, such projector will also have a clamping stud or bolt 25 arranged on its film reel receiving fixture and the film end will be secured automatically at the instant the film reel is mounted on such a fixture.

The film securing or clamping action is hereby as follows: When the film reel is pushed onto the arbor 23, the conical portion 26 of the clamping stud or bolt 25 will enter the axially alined apertures 19, 20 in reel core flanges, and thereby its cylindrical body portion moves the film strip 7, lying across recess 21, laterally into the recess or cavity 21 so that the film strip will be clampingly held across its entire width between cylindrical body of the stud or bolt 25 and the face of the recess or cavity 21. In order to increase the holding force the cylindrical body portion of the stud or bolt 25 may, of course, be roughened or may be covered with a friction-increasing surface layer or coating.

The film reel 1 of the arrangement just described, after removal from the special receiving fixture 23, 24, 25 operates, however, similar to any other conventional film reel from which the film end can run off freely.

Figure 5:
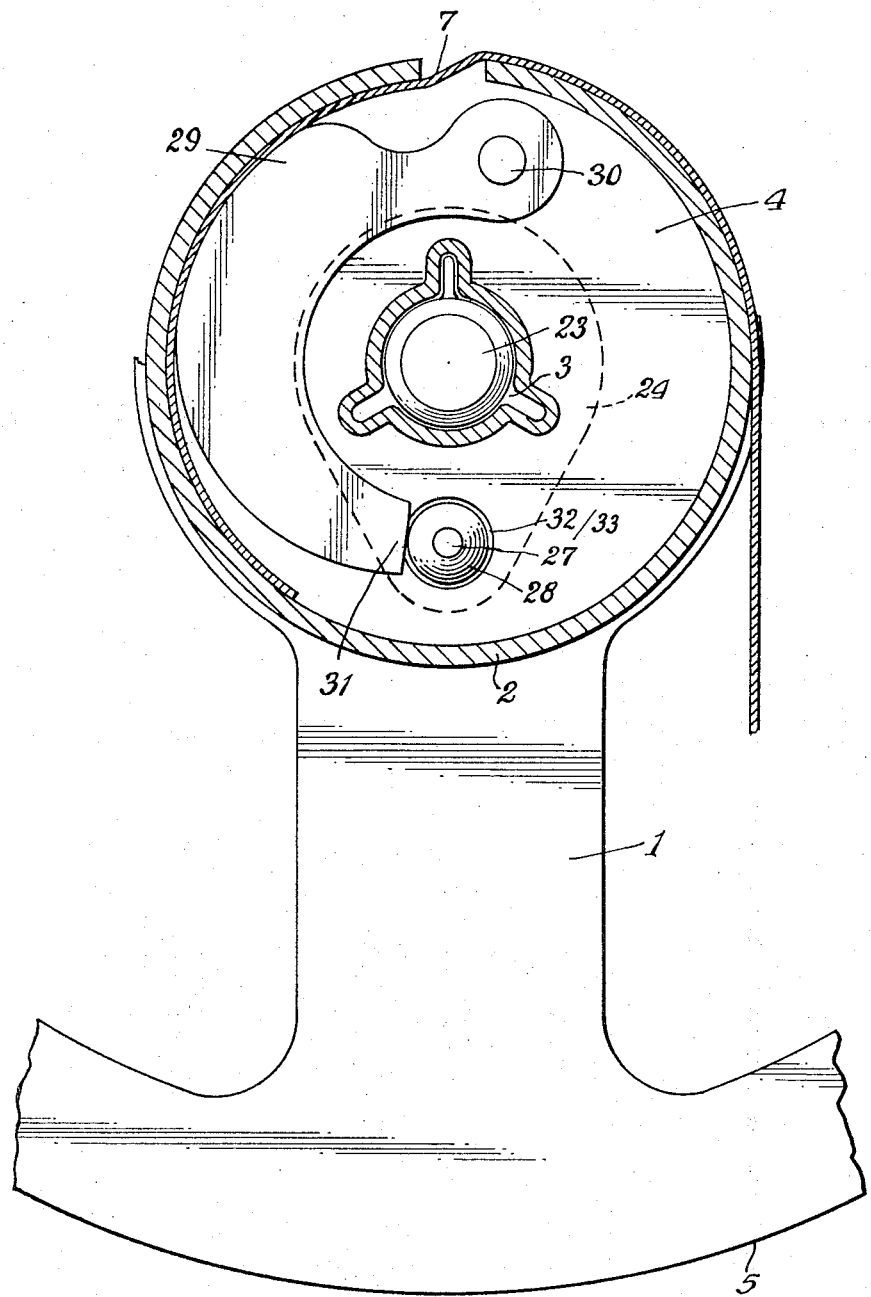
FIG. 5 is a fragmentary end view of an arrangement having the features of the embodiment shown in FIG. 3, but being of a modified construction.

The embodiment of the invention as illustrated in FIG. 5 is another example of an automatically operating film end securing device in which a shoe-like clamping member 29 is disposed within the hollow cylindrical core of the film reel 1. In place of the clamping stud or bolt 25 on the fixture flange 24 is employed a control pin 27 having a tapered end portion 28. The shoe-like clamping member 29 is pivotally mounted with one of its ends on a pivot pin 30 disposed within the hollow space of the reel core 2, while the other free end 31 of the member 29 is adapted to be actuated for outwardly swinging movement by the tapered portion 28 of the control pin 27 when this pin is axially moved through the axially alined apertures 32 and 33 in the flanges 4 of the reel 1.

When in this last described embodiment of the invention the end of the film is inserted into the reel core 2, it will enter into the space between its inner face of the hollow cylindrical core 2 and outer curved face of the clamping shoe 29, and when the reel is put on a special projector receiving fixture which carries the control pin 27, 28, this pin will swing the shoe 29 outwardly and will clamp the end portion 7 of the film securely against the inner face of the hollow cylindrical core 2. When the reel is mounted on a conventional reel mounting fixture however, the end of the film will not be clamped to the reel by any special clamping device and will be able to run off the reel upon an unwinding of the film.

What we claim is:

1. In a film reel for miniature film provided with a hollow cylindrical core having an internal peripheral surface and a slot in said core for the insertion of the end of a film strip, means for securing the end of the film strip to said internal peripheral surface of said reel, comprising a selectively operable clamping means arranged within said hollow cylindrical reel and optionally operable to engage the end of said film strip inserted through said slot for clamping it against the inner face of said hollow cylindrical core, said clamping device being mounted to frictionally clamp said film end to said internal peripheral surface at a point remote from said slot, and said clamping device being accessible when the film has been wound on the core of the reel, said clamping means being optionally disconnectable for securing the end of the film to the core of the reel and permitting free release of the film end from the rotating film reel at the end of the unwinding operation.

2. A film reel according to claim 1, in which said clamping means comprises an eccentric member rotatably mounted within said hollow cylindrical core and provided with means for adjusting it from the exterior of the reel.

3. A film reel according to claim 1, in which said clamping means comprises a fixedly mounted film strip guide member arranged within said core and forming between the same and the inner face of the wall of said core a slot for the introduction of the end of the film and a wedge-shaped space for clamping therein the end of the film a yieldably mounted roller for engaging said end of the film and also engaging a wall of said space, and manually operable means accessible from the exterior of said reel for releasing said roller from its clamping engagement.

4. A film reel according to claim 1, in which said clamping means comprises a fixedly mounted film strip guide member arranged within said core and forming between the same and the inner face of the wall of said core a slot for the introduction of the end of the film and a wedge-shaped space for clamping therein the end of the film a yieldably mounted roller for engaging said end of the film and also engaging a wall of said space, manually operable means accessible from the exterior of said reel for releasing said roller from its clamping engagement, and means for locking said roller in an inoperative position.

5. A film reel according to claim 1, in which said clamping means comprises a clamping bolt having a cylindrical body which enters from one end face of the reel into said hollow cylindrical core when the reel is mounted on the customary supporting spindle provided on a projection apparatus, said clamping bolt being fixedly mounted on said projection apparatus and being adapted, when entering the hollow core of said reel, to engage with its cylindrical body surface the end of the film inserted into said hollow core and clamp it against the inner face of said core.

6. A film reel according to claim 1, in which said clamping means comprises a clamping bolt having a cylindrical body which enters from one end face of the reel into said hollow cylindrical core when the reel is mounted on the customary supporting spindle provided on a projection apparatus, said clamping bolt being fixedly mounted on said projection apparatus and being adapted, when entering the hollow core of said reel, to engage with its cylindrical body surface the end of the film inserted into said hollow core and clamp it into a concave recess provided in the inner cylindrical face of said hollow core.

7. A film reel according to claim 5, including a friction increasing layer on the circumference of said bolt adapted to engage the end of the film inserted into said hollow core.

8. A film reel according to claim 1, in which said clamping means comprises a pivotally mounted shoe with a curved surface adapted to urge the film in engagement with the inner face of the wall of said hollow cylindrical core, and including a bolt with a conical free end mounted fixedly adjacent the customary reel supporting spindle on the projector, said conical free end of said bolt entering said hollow core and engaging said pivotally mounted shoe therein for moving the latter and therewith the film toward said inner face of said hollow core when the reel with the film wound thereon is mounted on said supporting spindle.

9. A film reel according to claim 1, in which a part of said clamping means is movably supported within said hollow cylindrical core of said reel, while another part is fixedly mounted on a projection apparatus to enter into said hollow core when the reel is attached to the customary supporting spindle on the projection apparatus.

References Cited

UNITED STATES PATENTS

| 823,765 | 6/1906 | Conklin | 242—74.1 X |
| 2,586,376 | 2/1952 | Picton | 242—74.1 X |
| 2,931,591 | 4/1960 | Zorn | 242—74.2 |

FOREIGN PATENTS

| 1,345,476 | 1/1963 | France | 242—74.1 |

FRANK J. COHEN, *Primary Examiner.*

N. L. MINTZ, *Assistant Examiner.*